No. 632,418. Patented Sept. 5, 1899.
E. F. LANDIS.
SPRAYING PLANTS.
(Application filed Dec. 14, 1898.)

(No Model.)

WITNESSES

INVENTOR
Ezra F. Landis
by Herbert W. T. Jenner.
Attorney

UNITED STATES PATENT OFFICE.

EZRA F. LANDIS, OF LA SALLE, NEW YORK.

SPRAYING PLANTS.

SPECIFICATION forming part of Letters Patent No. 632,418, dated September 5, 1899.

Application filed December 14, 1898. Serial No. 699,244. (No model.)

*To all whom it may concern:*

Be it known that I, EZRA F. LANDIS, a citizen of the United States, residing at La Salle, in the county of Niagara and State of New York, have invented certain new and useful Improvements in Apparatus for Spraying Plants; and I do hereby declare the following to be a full, clear, and exact description of the invention, such as will enable others skilled in the art to which it appertains to make and use the same.

This invention relates to apparatus for spraying plants; and it consists in the novel construction and combination of the parts hereinafter fully described and claimed.

Figure 1:
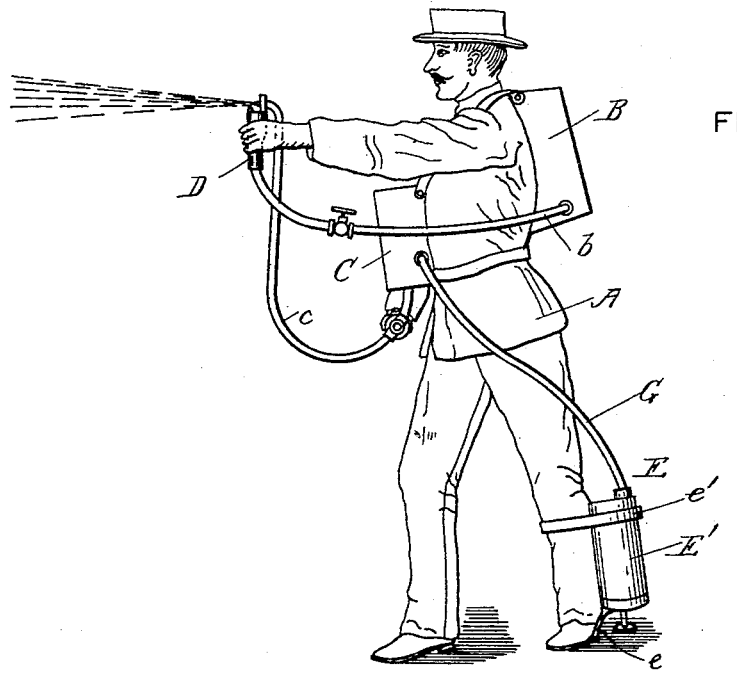
Figure 2:
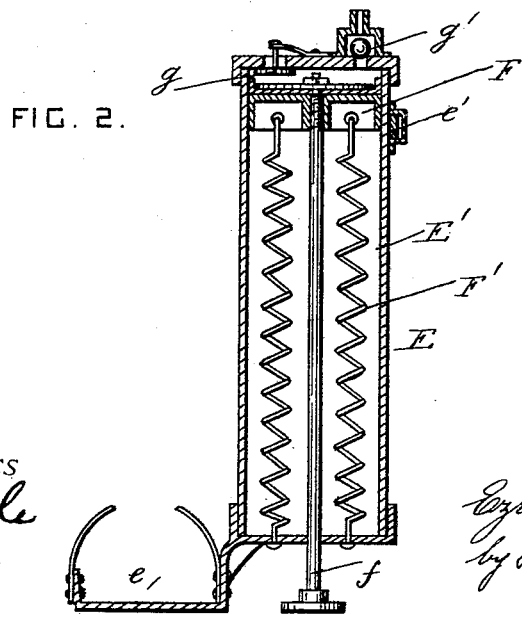

In the drawings, Figure 1 is a side view of the complete apparatus worked by a man. Fig. 2 is a longitudinal section through the air-pump, drawn to a larger scale.

In applying poison to plants to kill insect life it is desirable to apply the poison in liquid form under pressure and in the form of a fine spray instead of merely pouring it on the plants, and it is also desirable for the operator to have both his hands free to work the spraying apparatus.

A is a man.

B is a reservoir for the liquid poison, and C is a reservoir for compressed air.

D is a spraying device of any approved construction connected with the reservoirs B and C by flexible tubes $b$ and $c$, provided with suitable regulating-valves. The reservoirs B and C are portable and are attached to the body of the man in any approved manner. The spraying device is light and portable, so that it may be carried by one hand and turned about in any direction.

E is an air-pump for supplying the reservoir C with compressed air. This air-pump is secured to the man and is operated by his movements in the act of walking. The cylinder E' of the air-pump is provided with a plate or bracket $e$ on one side, which projects under the man's foot, and $e'$ is a strap or other fastening device for rigidly securing the cylinder to the man's leg. F is a piston slidable in the said cylinder and provided with a downwardly-projecting rod $f$ for operating it in one direction. F' is a spring or springs which operate the piston in the other direction and cause the said rod to project from the lower end of the cylinder. The air-pump is provided with an inlet-valve $g$ and an outlet-valve $g'$.

G is a flexible pipe which connects the outlet-valve with the air-reservoir.

Every time the man takes a step forward the rod is forced upward by contact with the ground and a charge of air is forced up the pipe G into the reservoir.

If desired, two similar air-pumps can be used and can be secured one to each leg of the man.

The apparatus may be variously modified in carrying out this invention and the air-pump may be secured to the man in any approved manner, so as to utilize the natural movements of his body in moving from place to place.

When the apparatus is used for spraying trees, the motion of a horse in walking may be utilized for working the air-pump and the spraying device may be manipulated by the rider. The foot-plate on the air-pump can project under the shoe of the horse in a similar manner to that hereinbefore described, or the air-pump can be attached in any other approved manner.

I do not confine myself to the use of the air-pump for the purpose of destroying insect life on plants, as the air-pump when thus operated by the natural movements of an animal, whether man or horse, may be used for a variety of purposes.

What I claim is—

1. The combination, with portable reservoirs for liquid and for compressed air, and means for attaching said reservoirs to an operator; of an air-compressing device, means for connecting the said device to one of the limbs of the operator, whereby the air-reservoir is replenished with air by the motion of the operator while walking, a spraying device, and connecting-pipes, substantially as set forth.

2. The combination, with portable reservoirs for liquid and for compressed air, and means for attaching the said reservoirs to an operator; of an air-compressing device, means for securing the said device to the foot of the operator so that a charge of air is forced into the air-reservoir at each step, a spraying device, and connecting-pipes, substantially as set forth.

3. The combination, with portable reservoirs for liquid and for compressed air, a spraying device, and pipes connecting the said parts; of a portable air-pump cylinder connected with the said air-reservoir and provided with a laterally-projecting foot plate or bracket and means for securing it to the limb of an animal, and a spring-operated piston provided with a rod which projects from the lower end of the cylinder and forces the piston upward by contact with the ground at each step, substantially as set forth.

4. The combination, with an air-pump cylinder provided with a laterally-projecting foot plate or bracket at its lower end, and means for securing the said cylinder and plate to the limb of an animal; of a piston, a spring for moving the piston downward in the cylinder, and a rod which projects from the lower end of the cylinder and pushes the piston upward when pressed against the ground, substantially as set forth.

In testimony whereof I affix my signature in presence of two witnesses.

EZRA F. LANDIS.

Witnesses:
K. A. LANDIS,
G. E. LANDIS.